(12) United States Patent
Ajam et al.

(10) Patent No.: US 10,618,010 B2
(45) Date of Patent: Apr. 14, 2020

(54) CARTRIDGE CLAMPING DEVICE

(71) Applicant: Sartorius Stedim Biotech GmbH, Goettingen (DE)

(72) Inventors: Mohammed Saeed Ajam, Dortmund (DE); Jan Schaefer, Edermuende (DE)

(73) Assignee: Satorius Stedim Biotech GmbH (DE)

( * ) Notice: Subject to any disclaimer, the term of this patent is extended or adjusted under 35 U.S.C. 154(b) by 0 days.

(21) Appl. No.: 16/063,313

(22) PCT Filed: Nov. 17, 2016

(86) PCT No.: PCT/EP2016/078052
§ 371 (c)(1),
(2) Date: Jun. 18, 2018

(87) PCT Pub. No.: WO2017/102241
PCT Pub. Date: Jun. 22, 2017

(65) Prior Publication Data
US 2018/0361322 A1 Dec. 20, 2018

(30) Foreign Application Priority Data
Dec. 18, 2015 (DE) .......................... 10 2015 122 261

(51) Int. Cl.
*B01D 63/08* (2006.01)
*B01D 65/00* (2006.01)

(52) U.S. Cl.
CPC ........... *B01D 63/082* (2013.01); *B01D 65/00* (2013.01); *B01D 2313/06* (2013.01);
(Continued)

(58) Field of Classification Search
None
See application file for complete search history.

(56) References Cited

U.S. PATENT DOCUMENTS

2006/0163141 A1  7/2006  Weinstein et al.
2013/0105325 A1  5/2013  Sparrow et al.
(Continued)

FOREIGN PATENT DOCUMENTS

DE  10 2006 009 804   9/2007
DE  20 2014 106 101   2/2015
(Continued)

OTHER PUBLICATIONS

International Search Report dated Mar. 9, 2017.
(Continued)

*Primary Examiner* — Richard C Gurtowski
(74) *Attorney, Agent, or Firm* — Gerald E. Hespos; Michael J. Porco; Matthew T. Hespos (57) ABSTRACT

A clamping device (1) is provided for cartridge filtration modules (2) that have a distribution plate (3) with a feed channel (18), a retentate channel (21), a filtrate channel, and a first contact surface (8). At least one filter cartridge can be clamped between a contact surface (8) of the distribution plate (3) and a clamping surface (29) of a clamping plate (4) that can be moved orthogonally to the contact surface (8). The cartridge filtration modules (2) can be stacked on one another in an area of their distribution plates (3). A common distribution plate (3) for adjacent filter cartridge arrangements can clamped against the contact surface (8). Adjacent filter cartridge arrangements can be connected in a parallel circuit via the distribution plate (3), and the cartridge filtration modules (2) that can be stacked on top of one another can be connected in series via the distribution plates (3).

14 Claims, 5 Drawing Sheets

(52) U.S. Cl.
CPC .. *B01D 2313/105* (2013.01); *B01D 2313/125* (2013.01); *B01D 2317/022* (2013.01); *B01D 2317/04* (2013.01)

(56) References Cited

U.S. PATENT DOCUMENTS

2013/0306539 A1   11/2013   Cirou et al.
2015/0360180 A1   12/2015   Lutz et al.

FOREIGN PATENT DOCUMENTS

EP   0 498 211   8/1992
WO   98/30308    7/1998

OTHER PUBLICATIONS

English Translation of International Preliminary Report on Patentability for Application No. PCT/EP2016/078052 dated Jun. 19, 2018.

CARTRIDGE CLAMPING DEVICE

BACKGROUND

Field of the Invention. The invention relates to a cartridge clamping device for a plurality of cartridge filtration modules.

Description of the Related Art. DE 10 2006 009 804 B4 discloses a cartridge clamping device for cross-flow filter cassettes. Each cross-flow filter cassette that is used with the cartridge clamping device of DE 10 2006 009 804 B4 has a plurality of cartridge filtration modules, each of which has a distribution plate with one feed channel, one retention channel, one filtrate channel, and at least one first contact surface. A filter cartridge arrangement consisting of at least one filter cartridge can be clamped between the first contact surface of the distribution plate and a clamping surface of a clamping plate that can be moved orthogonally to the contact surface via guiding rods. The cartridge filtration modules can be stacked on top of one another in the area of their distribution plates. The cartridge filtration modules that are stacked on top of each other in the area of their distribution plates are connected to each other in the manner of a parallel circuit.

Although the known device has proven itself in service, it has the disadvantage that, despite an essentially identical configuration of the individual distribution plates, with vertical orientation of the filter cartridges a serial flow through the filter cartridges as well is not possible.

EP 0 498 211 B1 discloses a cartridge clamping device for crossflow filter cartridges in which, for example, four cartridges filtration modules are stackable on top of one another. Thus, the first and second modules as well as the second and third modules are respectively connected in parallel to one another, and the second and third modules are connected to one another in series.

A disadvantage of this arrangement is that any two filtration modules that are adjacent to one another must be configured differently. It is also disadvantageous in the case of this known cartridge clamping device that the filter cartridges are arranged transverse to the stack direction, i.e., the feed channel, the retention channel and the filtrate channels of the distribution plate are arranged parallel to the stack direction of the cartridge filtration modules.

Furthermore, DE 20 2014 106 101 U1 discloses a cartridge clamping device for holding a pre-determinable number of filter cartridges with two pressure plates that are on at least one guide rail displaceable relative to each other and between which the filter cartridges are clampable. At least one of the filter cartridges has a distribution plate.

A disadvantage of this design is that the filter cartridges are aligned one inside the other only in the horizontal direction. A parallel arrangement of multiple filter modules (filter cartridges with distribution plates) in a horizontal plane or even a stacking of filter modules in the vertical direction is not provided here.

US 2013/0306539 A1 discloses a cartridge clamping device for holding filter cartridges between two pressure plates that are displaceable relative to each other and between which the filter cartridges are clampable with at least one distribution plate.

In this case, too, the individual filter cartridges are lined up in a single row along a horizontal direction. A parallel arrangement of filter modules adjacent to each other in the horizontal direction or stacked on top of one another in the vertical direction is not provided in this design.

Finally, US 2006/0163141 A1 discloses a cartridge clamping device for a plurality of filter cartridges with two pressure plates that are on at least one guide rail displaceable relative to each other and between which the filter cartridges are clampable. At least one of the clamping plates in this design is configured as a distribution plate.

In this design, too, the filter cartridges are lined up in a single row along a horizontal direction. A parallel arrangement of filter modules in a horizontal or vertical plane is likewise not provided here.

The present invention seeks to solve the problem of enabling both parallel and serial flow into filter cartridges that are vertically arranged in the stack direction. At the same time, the invention seeks to simplify the structure of the distribution plates and the cartridge filtration modules.

SUMMARY

The invention relates to a cartridge clamping device for a plurality of cartridge filtration modules. Each cartridge filtration module has a distribution plate with at least one feed channel, one retention channel, one filtrate channel, and at least one first contact surface. A filter cartridge arrangement consisting of at least one filter cartridge can be clamped between the first contact surface of the distribution plate and a clamping surface of a clamping plate that can be moved orthogonally to the contact surface via guiding rods. The cartridge filtration modules can be stacked on top of one another in the area of their distribution plates. The distribution plate is configured as a common distribution plate for two filter cartridge arrangements that can be arranged adjacent to one another and clamped against the contact surface. The filter cartridge arrangement that can be arranged adjacent to one another can be connected to one another in a parallel circuit via the distribution plate. The cartridge filtration modules, which can be stacked on top of one another, can be connected in series to one another via the distribution plates thereof.

The adjacent filter cartridge arrangements that are connected to one another via the distribution plate in a parallel circuit doubles the respective incident flow width. Thus, commercially available market filter cartridges can be used. As a result, filter cartridges, for example crossflow filter cartridges, can be used without changing their geometry, like filter cartridges with a larger format. The connectability of the cartridge filtration modules stacked on top of one another to one another via their distribution plates in a series circuit accordingly extends the flow path via the stacking. Another advantage of the cartridge clamping device is that, when the stack is extended within certain limits, the pump capacity and, thus, the dimension of feed and retentate piping does not have to be increased.

With this cartridge clamping device, a certain product concentration can be achieved with reduced product circulation. Thus, a filtration process can be done with this cartridge in a manner that is gentler on the product. The combination of series circuit and parallel arrangement of the filter cartridge arrangements provides a type of large-surface filter cartridge that is assembled from standard cartridges. As a result, the disadvantages of large filter cartridges in a special format are avoided because the costs are higher when a large surface filter cartridge fails than is the case with standard cartridges. Moreover, the pump capacity for the flow through the filter cartridges can be used more efficiently with this cartridge clamping device. Finally, the distribution plates and their connections are simplified because a common distribution plate is used for the filter cartridge arrangements that are arranged in parallel adjacent to each other.

The distribution plate has a rear side that faces away from the first contact surface. The rear side may define a second contact surface for two additional filter cartridge arrangements that can be arranged adjacent to each other and clamped against the second contact surface. Thus, one distribution plate can be used for both of two filter cartridge arrangements on both contact surfaces.

The distribution plate may be delimited laterally and transverse to the stack direction by first and second lateral faces. Each of the lateral faces runs parallel to one another in the stack direction and may have at least one filtrate outlet. As a result, the determination of integrity can be carried out separately on each cartridge filtration module.

The distribution plate may be delimited at the bottom in the stack direction by a lower lateral face running transverse to the stack direction and at the top in the stack direction by an upper lateral face running transverse to the stack direction. The lower lateral face may have a feed connection for fluid to be filtered and the upper lateral face may have a retentate connection for retentate to be discharged.

The feed channel, the retention channel and the filtrate channels of the distribution plate may be arranged transverse to the stack direction. The feed channel may be arranged with a plurality of feed inlets arranged in a line, the retentate channel with a plurality of retentate outlets arranged in a line and the filtrate channels with a plurality of filtrate outlets arranged in a line. The feed inlets, the retentate outlets and the filtrate outlets may correspond via openings on the contact surfaces of the distributor plate to openings of adjacent filter cartridges.

The retention channel and the feed channel of distribution plates adjacent to one another (in the stack direction) may be connectable to one another via a connecting channel running in the stack direction.

The bottommost distribution plate in the stack direction may have the feed connection for a fluid inlet. The feed connection may be connected to the feed channel of the bottommost distribution plate via a connecting channel running up in the stack direction. Accordingly, the uppermost distribution plate in the stack direction has the retentate connection for a retentate discharge. The retentate connection may be connected to the retentate channel of the uppermost distribution plate via a connecting channel running down in the stack direction.

At least two cartridge filtration modules may be stacked on top of one another in the area of their distribution plates.

Three cartridge filtration modules may be stacked on top of each other in the area of their distribution plates.

Additional features and advantages of the invention are evident from the following special description and the drawings.

DETAILED DESCRIPTION

Figure 1:
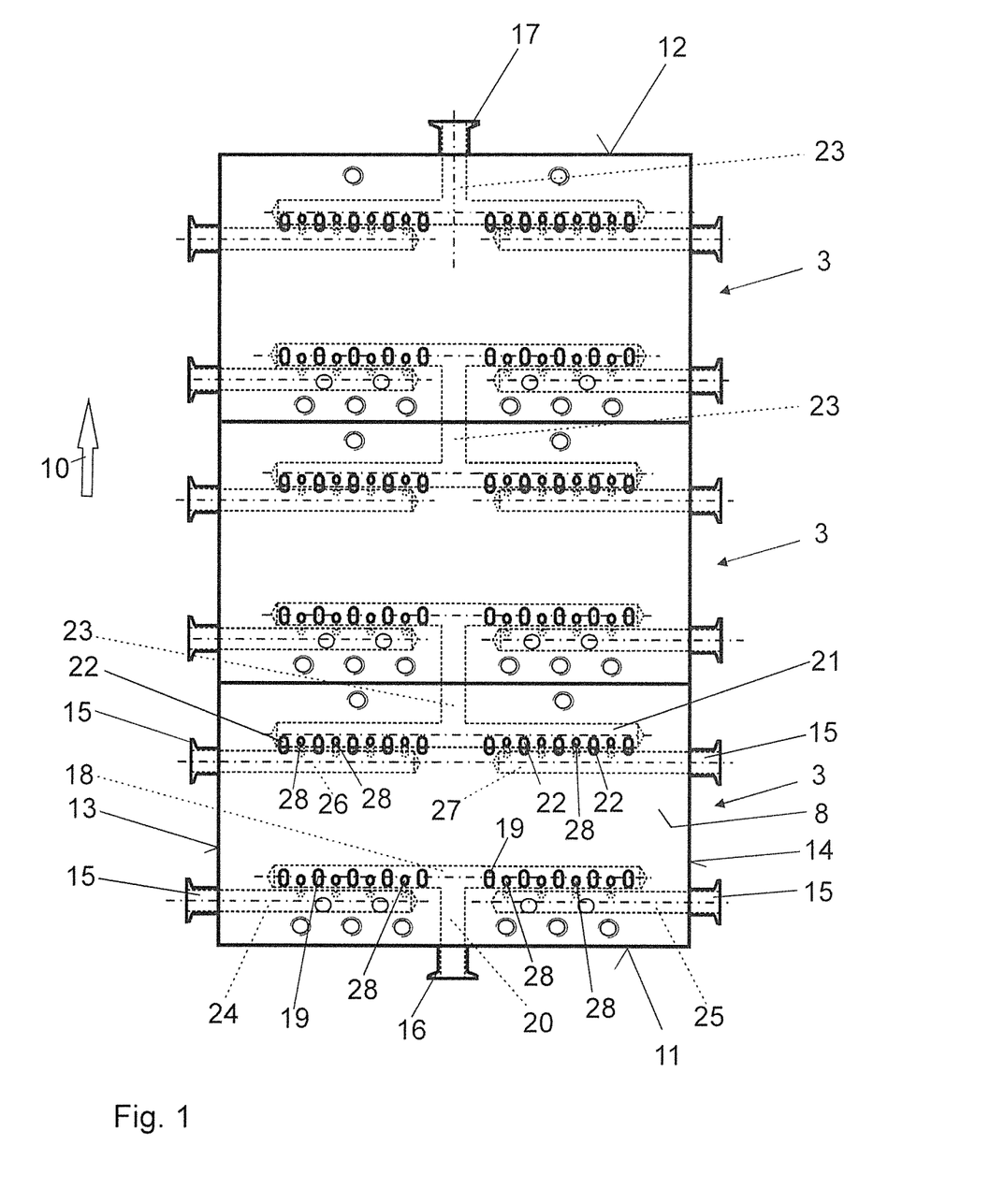
FIG. 1 is a front view of three distribution plates stacked on top of one another with a feed connection centrally arranged on the lower lateral surface of the bottommost distribution plate and a retentate connection centrally arranged on the upper lateral face of the uppermost distribution plate.
Figure 2:
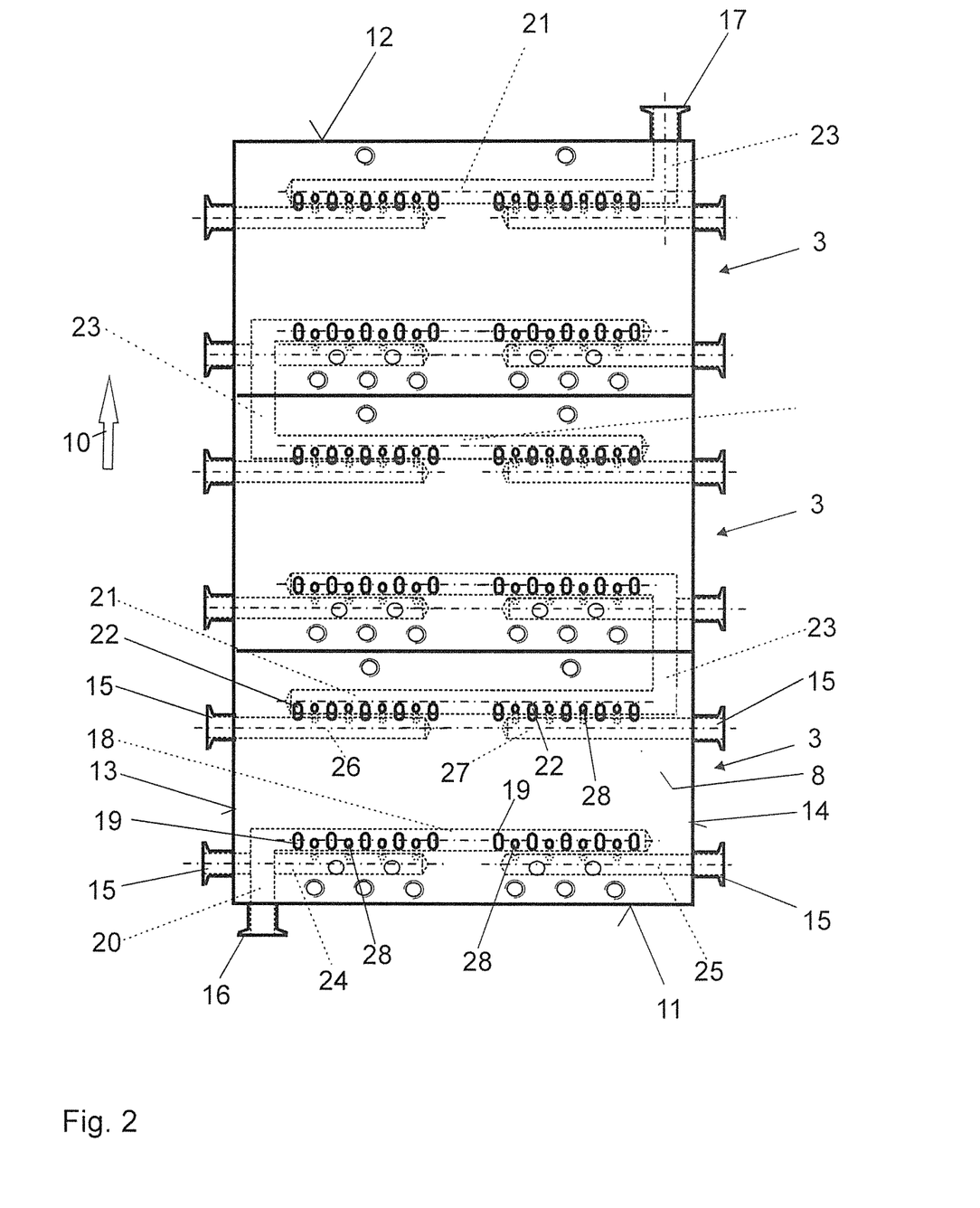
FIG. 2 is a front view of three further distribution plates stacked on top of one another with a feed connection laterally arranged on the lower lateral face of the bottommost distribution plate and a retentate connection laterally arranged on the upper lateral face of the uppermost distribution plate.
Figure 3:
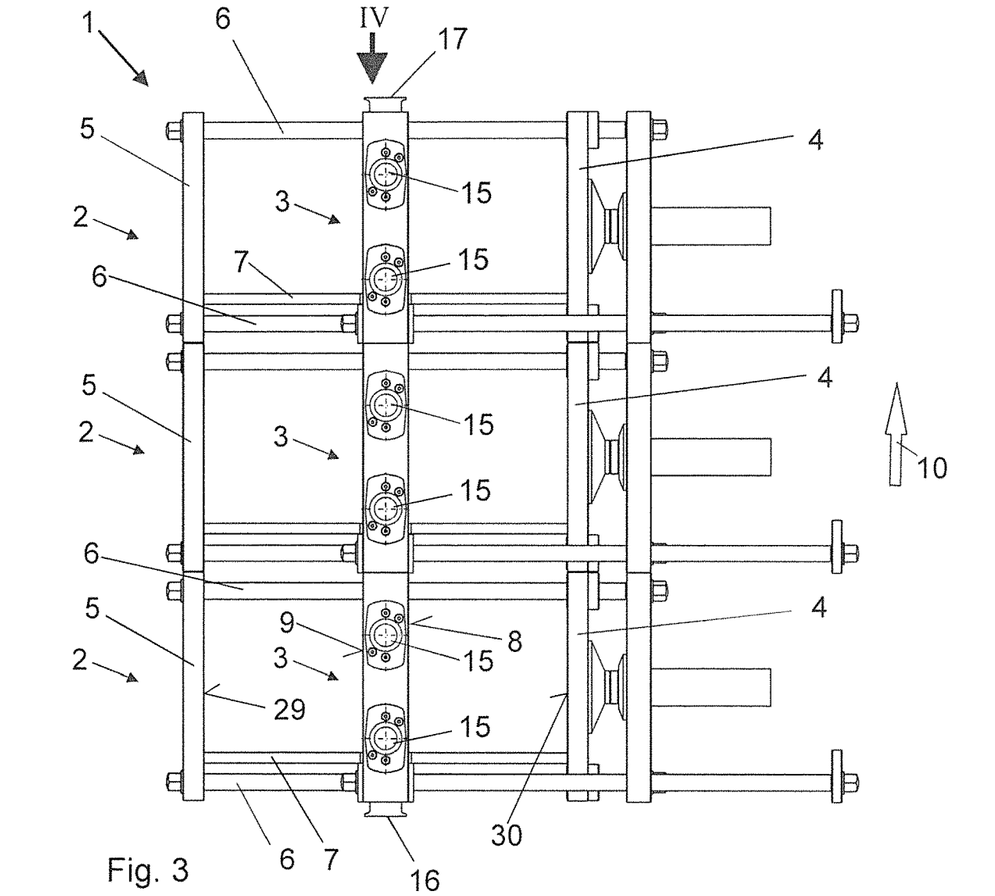
FIG. 3 is a lateral view of a cartridge clamping device for crossflow filter cartridges with three cartridge filtration modules stacked on top of one another in the stack direction.
Figure 4:
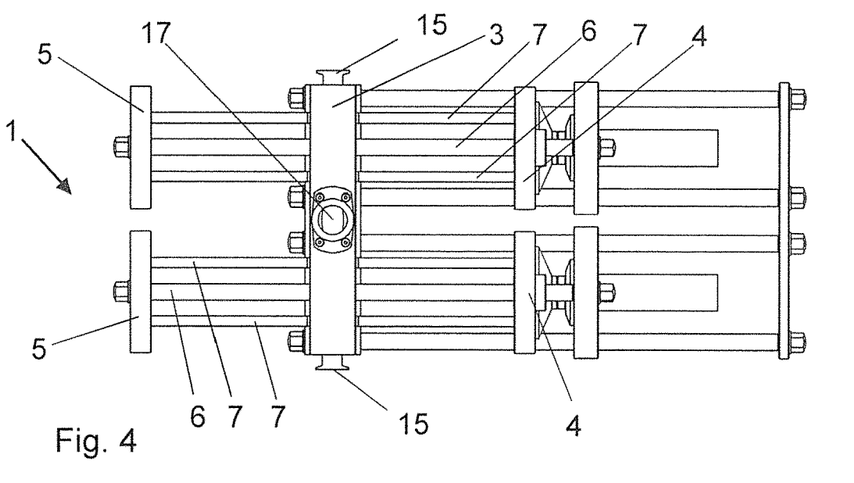
FIG. 4 is a top view on the cartridge clamping device of FIG. 3 from direction IV.
Figure 5:
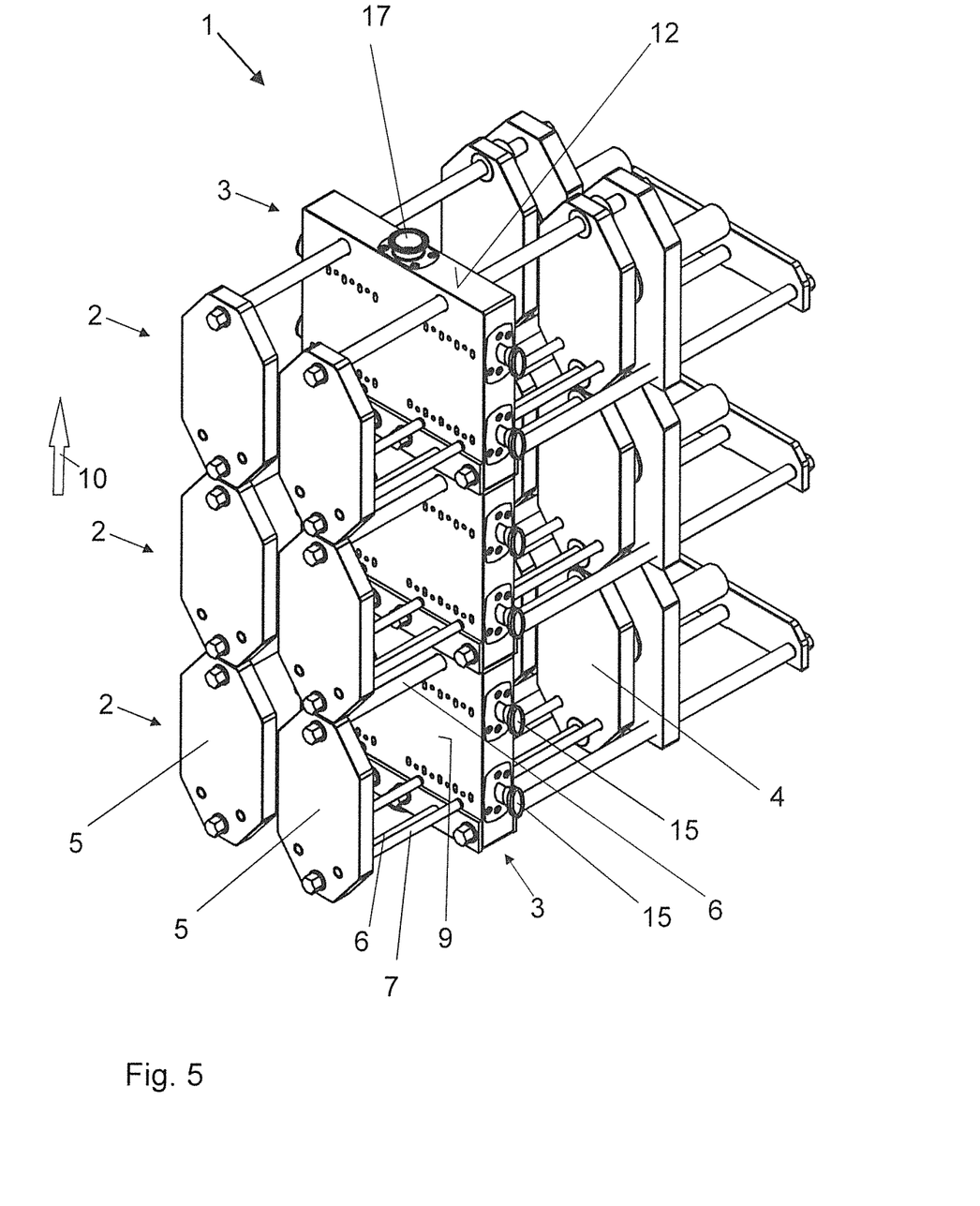
FIG. 5 is a three-dimensional representation of the cartridge clamping device of FIG. 3.
Figure 6:
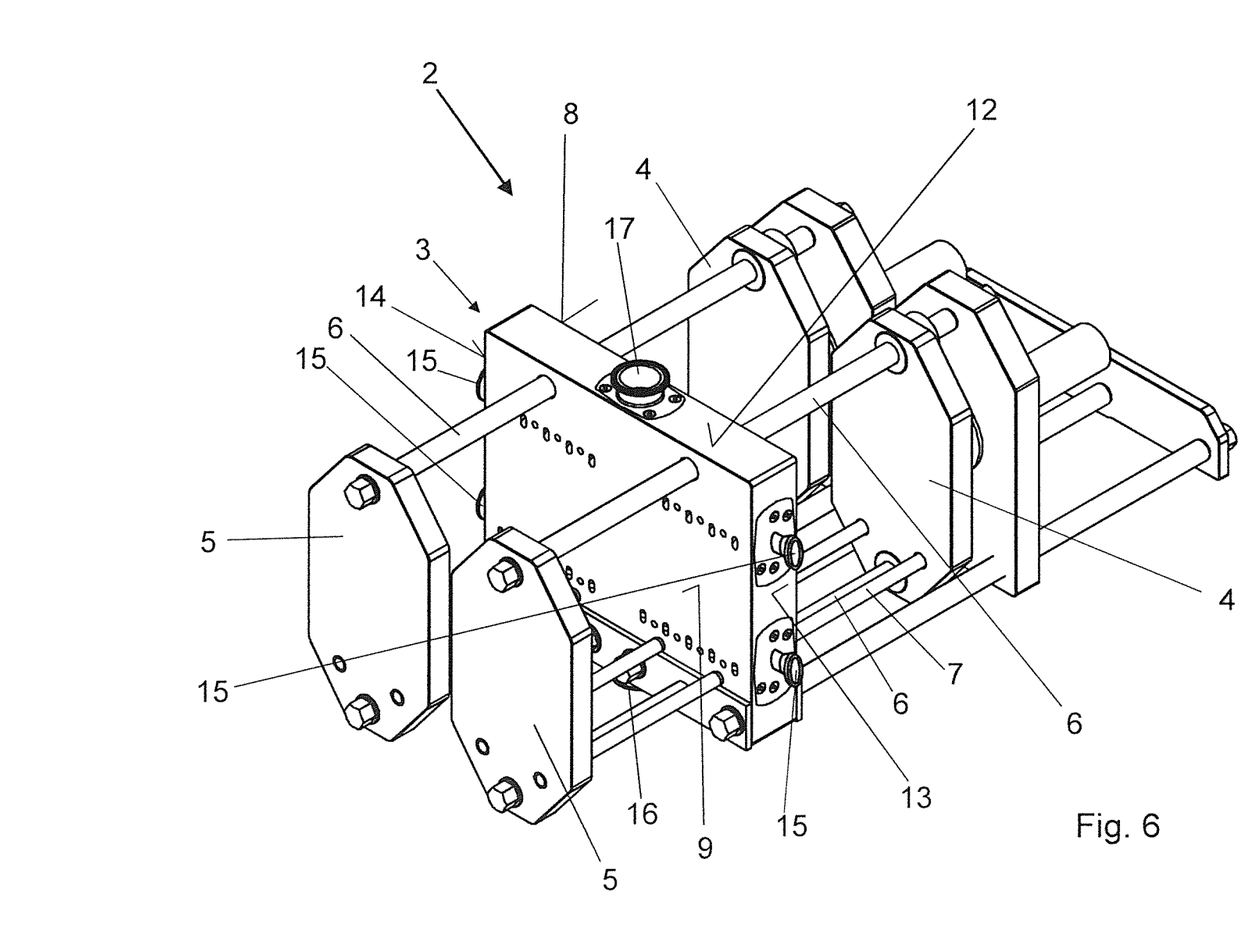
FIG. 6 is a three-dimensional representation of a cartridge clamping device.

A cartridge clamping device 1 for a crossflow cartridge filtration system essentially comprises cartridge filtration modules 2 that are stacked on top of one another in the area of their distribution plates 3.

The cartridge filtration module 2 essentially comprises the distribution plate 3 and cartridge filters (not depicted) arranged on both sides of the distribution plate 3 that are pressed by clamping plates 4, 5 with clamping surfaces 29, 30 against the contact surfaces 8, 9 of distribution plate 3 that face the cartridge filters. The clamping plates 4, 5 are connected via guiding rods 6, 7 to the distribution plate 3.

The distribution plate 3 is configured as a common distribution plate for two filter cartridge arrangements that can be arranged adjacent to one another and clamped against the contact surfaces 8, 9. In this design, the filter cartridge arrangements that can be arranged adjacent to one another are connectable to one another in a parallel circuit via the common distribution plate 3.

The distribution plate 3 is delimited laterally at the bottom in stack direction 10, i.e. counter to stack direction 10, by a lower lateral face 11 running transverse to the stack direction 10 and at the top in stack direction 10 by an upper lateral face 12 running transverse to the stack direction 10. The distribution plate 3 is delimited laterally transverse to the stack direction 10 by a first lateral face 13 and, parallel to the first lateral face 13 by a second lateral face 14. The distribution plate 3 has on its front side the first contact surface 8 and has on its rear side, which faces away from the front side, the second contact surface 9. Each of the lateral faces 13, 14 running parallel to one another in stack direction 10 has two filtrate connections 15.

The lower side lateral face 11 of the lower distribution plate 3 in stack direction 10 has a feed connection 16 for fluid to be filtered, and the upper lateral face 12 of the uppermost distribution plate 3 in stack direction 10 has a retentate connection 17 for retentate to be discharged.

The distribution plate 3 has a horizontal feed channel 18 in its lower area in vertical stack direction 10. From feed channel 18, feed inlets 19 individually lead to the first contact surface 8 and to the second contact surface 9 of the distribution plate 3. The openings of the feed inlets 19 run in a line running transverse to the stack direction 10. A first connecting channel 20, which connects the feed channel 18 to the feed connection 16, runs in stack direction 10. A retentate channel 21 is arranged parallel to the feed channel 18 in the upper area in vertical stack direction 10. The retention channel 21 is connected with retentate outlets 22, which are each arranged in a horizontal line or row on the first contact surface 8 and on the second contact surface 9. The retentate channel 21 is connected to the first connecting channel 20 of the adjacent distribution plate 3 via a second connecting channel 23, which also runs in stack direction 10.

In the lower area of distribution plate 3 parallel to the feed channel 18, a first lower filtrate channel 24 and a second lower filtrate channel 25 are attached through the lateral faces 13, 14 respectively. A third upper filtrate channel 26 and a fourth upper filtrate channel 27 are accordingly arranged parallel to the retentate channel 21 through the lateral faces 13, 14 in the upper area of the distribution plate 3. The filtrate channels 24, 25, 26, 27 are connected to filtrate outlets 28, each of which are arranged in a horizontal line or row on the first contact surface 8 and on the second contact surface 9 of the distribution plate 3. The filtrate channels 24, 25, 26, 27 are each connected on their part to the filtrate connections 15 that are laterally arranged on the distribution plate 3. Essentially, the first and second bottom filtrate channels 24, 25 and likewise the third and fourth upper filtrate channels 26, 27 can transition into one another, wherein only one lateral filtrate connection 15 each is needed for the lower filtrate channels 24, 25 and the upper filtrate channels 26, 27.

The openings arranged on the contact surfaces 8, 9 of the distribution plate 3 for the feed inlets 19, the retentate outlets 22 and the filtrate outlets 15 correspond to respective openings of adjacent filter cartridges.

The cartridge filtration modules 2 stacked on top of one another are connected to each other in a series circuit via their distribution plates 3.

Of course, the embodiments discussed in the specific description and shown in the figures are merely illustrative exemplary embodiments of the present invention. In the light of the present disclosure, there is a broad spectrum of optional variations available to a person skilled in the art.

LIST OF REFERENCE NUMBERS 1 cartridge clamping device
2 cartridge filtration module
3 distribution plate
4 clamping plates
5 clamping plates
6 guiding rods
7 guiding rods
8 contact surface of 3
9 contact surface of 3
10 stack direction
11 lower lateral face of 3
12 upper lateral face of 3
13 first lateral face of 3
14 second lateral face of 3
15 filter connection of 13, 14
16 feed connection of 11
17 retentate connection of 12
18 feed channel of 3
19 feed inlet of 18
20 first connecting channel of 3
21 retentate channel of 3
22 retentate outlet of 21
23 second connecting channel of 3
24 first filtrate channel of 3
25 second filtrate channel of 3
26 third filtrate channel of 3
27 fourth filtrate channel of 3
28 filtrate outlet of 24, 25, 26, 27
29 clamping surface of 4
30 clamping surface of 5

The invention claimed is:

1. A cartridge clamping device (1) for a plurality of cartridge filtration modules (2), each of the cartridge filtration modules (2) having a distribution plate (3) that has a feed channel (18), a retentate channel (21), filtrate channels (24, 25, 26, 27), and a first contact surface (8), wherein a filter cartridge arrangement consisting of at least one filter cartridge can be clamped respectively between the first contact surface (8) of the distribution plate (3) and a clamping surface (29) of a clamping plate (4) that can be moved orthogonally to the contact surface (8) via guiding rods (6, 7), and wherein the cartridge filtration modules (2) can be stacked in a stack direction (10) on top of one another in an area of their distribution plates (3), wherein
   each of the distribution plates (3) is configured as a common distribution plate for two filter cartridge arrangements that can be arranged adjacent to one another and clamped against the contact surface (8),
   the filter cartridge arrangements that can be arranged adjacent to one another can be connected to one another in a parallel circuit via the distribution plate (3), and the cartridge filtration modules (2) that can be stacked in the stack direction (10) on top of one another can be connected in series to one another via the distribution plates (3) thereof, and
   the retentate channel (21) and the feed channel (18) of the distribution plates (3) that are adjacent to each other are respectively connectable to each other via a connecting channel (23) running in the stack direction (10).

2. The cartridge clamping device of claim 1, wherein the distribution plate (3) has a rear side that faces away from the first contact surface (8), the rear side having a second contact surface (9) for two further filter cartridge arrangements that can be arranged adjacent to one another and clamped against the second contact surface (9).

3. The cartridge clamping device of claim 2, wherein the distribution plate (3) is laterally delimited transverse to the stack direction (10) by a first lateral face (13) and a second lateral face (14), each of the lateral faces (13, 14) running parallel to one another in the stack direction (10) and having at least one filtrate connection (15).

4. The cartridge clamping device of claim 3, wherein the distribution plate (3) is laterally delimited at a bottom in the stack direction (10) by a lower lateral face (11) running transverse to the stack direction (10) and at a top in the stack direction (10) by an upper lateral face (12) running transverse to the stack direction (10) and the lower lateral face (12) has a feed connection (16) for fluid to be filtered and the upper lateral face has a retentate connection (17) for retentate to be discharged.

5. The cartridge clamping device of claim 4, wherein the feed channel (18), the retentate channel (21) and the filtrate channels (24, 25, 26, 27) of the distribution plate (3) are arranged transverse to the stack direction (10), the feed channel (18) is arranged with a plurality of feed inlets (19) arranged in a line, the retentate channel (21) has a plurality of retentate outlets (22) arranged in a line and the filtrate channels (24, 25, 26, 27) have a plurality of filter outlets (28) arranged in a line, and
   the feed inlets (19), the retentate outlets (22) and the filtrate outlets (28) correspond via openings on the contact surfaces (8, 9) of the distribution plate (3) to openings of adjacent filter cartridges.

6. The cartridge clamping device of claim 4, wherein a bottommost distribution plate (3) in the stack direction (10) has the feed connection (16) for a fluid supply line and the feed connection (16) is connected via a connecting channel (20) running upward in the stack direction (10) to the feed channel (18) of the bottommost distribution plate (3).

7. The cartridge clamping device of claim 4, wherein
an uppermost distribution plate (3) in the stack direction (10) has the retentate connection (17) for a retentate discharge and
the retentate connection (17) is connected via a connecting channel (23) running downward in the stack direction (10) to the retentate channel (21) of the uppermost distribution plate (3).

8. The cartridge clamping device of claim 3, wherein
at least two cartridge filtration modules (2) are stacked on top of one another in an area of their distribution plates (3).

9. The cartridge clamping device of claim 1, wherein
the distribution plate (3) is laterally delimited transverse to the stack direction (10) by a first lateral face (13) and a second lateral face (14), each of the lateral faces (13, 14) running parallel to one another in the stack direction (10) and having at least one filtrate connection (15).

10. The cartridge clamping device of claim 1, wherein
the distribution plate (3) is laterally delimited at a bottom in the stack direction (10) by a lower lateral face (11) running transverse to the stack direction (10) and at a top in the stack direction (10) by an upper lateral face (12) running transverse to the stack direction (10) and
the lower lateral face (12) has a feed connection (16) for fluid to be filtered and the upper lateral face has a retentate connection (17) for retentate to be discharged.

11. The cartridge clamping device of claim 10, wherein
the feed channel (18), the retentate channel (21) and the filtrate channels (24, 25, 26, 27) of the distribution plate (3) are arranged transverse to the stack direction (10),
the feed channel (18) is arranged with a plurality of feed inlets (19) arranged in a line, the retentate channel (21) has a plurality of retentate outlets (22) arranged in a line and the filtrate channels (24, 25, 26, 27) have a plurality of filter outlets (28) arranged in a line, and
the feed inlets (19), the retentate outlets (22) and the filtrate outlets (28) correspond via openings on the contact surfaces (8, 9) of the distribution plate (3) to openings of adjacent filter cartridges.

12. The cartridge clamping device of claim 10, wherein
a bottommost distribution plate (3) in the stack direction (10) has the feed connection (16) for a fluid supply line and
the feed connection (16) is connected via a connecting channel (20) running upward in the stack direction (10) to the feed channel (18) of the bottommost distribution plate (3).

13. The cartridge clamping device of claim 10, wherein
an uppermost distribution plate (3) in the stack direction (10) has the retentate connection (17) for a retentate discharge and
the retentate connection (17) is connected via a connecting channel (23) running downward in the stack direction (10) to the retentate channel (21) of the uppermost distribution plate (3).

14. The cartridge clamping device of claim 1, wherein
at least two cartridge filtration modules (2) are stacked on top of one another in an area of their distribution plates (3).

* * * * *